Jan. 16, 1962 J. W. POND 3,017,308

METHOD OF PROVIDING A VALVE IN AN INFLATABLE TIRE

Original Filed April 23, 1956

INVENTOR.
JAMES W. POND
BY W. A. Shira, Jr.
ATTY.

3,017,308
Patented Jan. 16, 1962

3,017,308
METHOD OF PROVIDING A VALVE IN AN INFLATABLE TIRE
James W. Pond, Doylestown, Ohio, assignor to The B. F. Goodrich Company, New York, N.Y., a corporation of New York
Original application Apr. 23, 1956, Ser. No. 583,350, now Patent No. 2,942,642, dated June 28, 1960. Divided and this application Oct. 14, 1958, Ser. No. 767,219
7 Claims. (Cl. 156—120)

This invention relates to inflatable vehicle tires and, more particularly, to the method of providing the sidewall of such a tire with a valve, this application being a division of my copending application S.N. 583,350, filed April 23, 1956, now Patent No. 2,942,642.

Recently, it has been proposed that the conventional spare or extra tire and wheel assembly be eliminated from passenger vehicles and replaced by an emergency tire having sufficient flexibility to permit folding or collapsing when deflated. A tire of this nature is disclosed and claimed in the copending application of Frank Herzegh and James W. Pond, Serial No. 580,291, filed April 24, 1956. Such a tire preferably has a self-contained inflation chamber to which inflation fluid is to be supplied through a valve secured to a part of the tire as, for example, the sidewall of the carcass, so that it is unnecessary to remove the conventional tubeless tire valve from the rim when the tire replaced is of the latter type. Likewise, the provision of a valve in the carcass sidewall makes it unnecessary to plug or seal the valve opening in the wheel rim when the conventional tire removed therefrom is of the type employing a separate inner tube nor is it necessary to locate the emergency tire on the rim so that its valve passes through the valve opening in the rim.

The provision of the inflation controlling valve in the sidewall of a conventional tubeless vehicle tire, especially of the type employed on passenger vehicles, is also advantageous since it permits the wheel rim to be formed without a valve hole or slot, thereby reducing the cost and eliminating one possible avenue of leakage of the inflation fluid. In addition, the elimination of the separate tire valve as now used for tubeless tire inflation, makes mounting of the tires more rapid and less difficult.

An object of the invention is to provide an improved method of incorporating an inflation controlling valve in the sidewall of the tire in a manner such that the stem may be applied after cure of the tire so that the surface of the tire has no outwardly projecting portions during shaping or curing operations.

A more specific object of the invention is to provide an improved method of incorporating an inflation controlling valve in the sidewall of the tire characterized by the placing of a metal base member between the plies of the tire carcass sidewall during building of the latter with the ends of the base member entirely disposed beneath the surface of the tire prior to cure thereof, a valve stem member thereafter being screwed into a threaded bore in the base member to provide a readily accessible valve without the need of forming or curing equipment especially designed to accommodate the radially extending valve stem.

A still more specific object of the invention is to provide an improved method of incorporating an inflation controlling valve into a tire, characterized by the valve having a metal base member with a threaded bore, which base member is embedded in a rubber pad and the latter is then incorporated between the fabric plies of the sidewall of a green tire carcass, with the said bore closed or plugged, after which the tire is cured and the plug in the valve base is replaced by a valve stem provided with a valve core.

Further objects and advantages of the invention will be apparent to those skilled in the art to which the invention pertains from the following description of the presently preferred embodiment, and a modification thereof, described in conjunction with the accompanying drawing forming a part of this application and in which.

Figure 1:
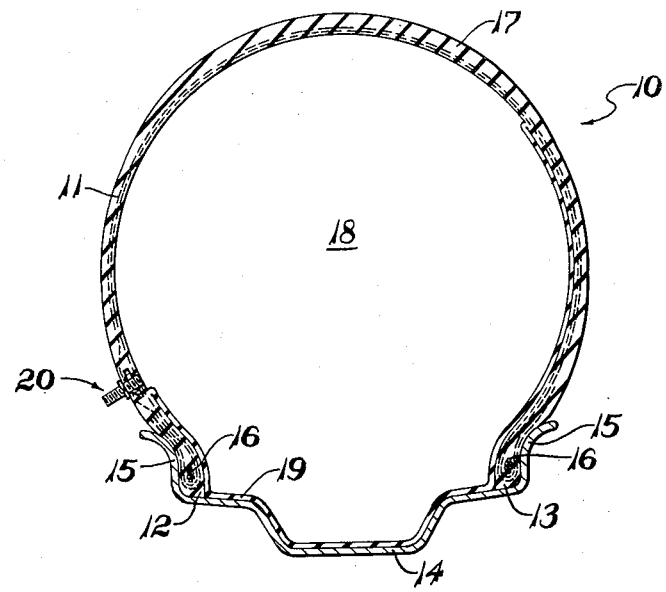
FIG. 1 is a fragmentary transverse sectional view through an emergency tire mounted on a rim and inflated, the tire being provided with a valve in the sidewall in accordance with this invention.

The invention is herein illustrated and described specifically with reference to its employment in an emergency tire of the type disclosed and claimed in the aforementioned copending application Serial No. 580,291, filed April 24, 1956, since such use facilitates exposition of the procedure and the details of construction. A tire 10 of this nature comprises a thin wall carcass 11 formed of fabric reinforced elastomer, the carcass having axially spaced circumferentially extending beads 12 and 13 adapted to be mounted upon the bead seats of a conventional wheel rim 14 in engagement with the flanges 15 of the latter. The beads 12 and 13 are each provided with a bead core 16 which is circumferentially non-extensible as in conventional tires but preferably differs therefrom in being laterally flexible to permit folding of the tire when the latter is deflated.

In addition to flexibility of the bead cores, an emergency tire of the type indicated at 10 should possess a tread and sidewall construction of sufficient flexibility to permit collapse or folding of the tire when deflated. Therefore, the carcass 11 of the tire may employ as few as two plies of bias-laid cord fabric and the tread 17 of the tire may be formed by a comparatively thin piece of tread stock placed on the running surface of the tire and extending down the sidewalls of the carcass only far enough to protect the latter during cornering or turning.

In view of the fact that the emergency tire 10 is intended to be capable of use without the necessity of removing from the rim the inflation valve normally employed for a tubeless tire, and without the need of separate inner tube, the tire 10 includes a self-contained inflation chamber 18. This self-contained inflation chamber is formed by employing a portion of the interior surface of the carcass 11 as a part of the wall of that chamber and a flexible annular sheet or layer 19 of elastomer, united to the wall of the carcass along the circumferential extending marginal or edge portions of the sheet, as the remainder of the wall of the chamber. The construction of a tire of this nature is such that, when the tire is mounted on a wheel rim and inflation fluid is supplied to the inflation chamber 18, the annular sheet or layer 19 is deformed into the wheel rim in the manner shown in FIG. 1.

Inflation of the tire 10 is effected through a valve means 20 that is mounted in the sidewall of the tire intermediate one of the beads 12 or 13 and the running surface or tread portion 17 of the tire. Preferably, this valve is located radially inwardly of the region of maximum transverse diameter of the tire to eliminate or reduce the possibility of injury to the valve as the tire moves closely adjacent a stationary object. The valve is however, located a sufficient distance radially outwardly from the adjacent bead so that the valve is above the rim flange 15 and cannot engage the latter upon turning or cornering of the wheel on which the tire is mounted.

In accordance with this invention, the valve 20 is provided in the sidewall of the tire in a manner such that there is no projecting portion extending beyond the surfaces of the tire carcass during forming and curing of the tire so that the latter can be handled by forming and curing apparatus of conventional construction, the valve stem being applied to the valve assembly after curing of the tire sidewall. These advantages are achieved by providing the valve in two detachable parts, one of which comprises a base member 21, which is incorporated into the tire sidewall during building of the latter, the other portion of the valve comprising the removable valve stem 22 provided with the conventional valve core 23, this stem being applied to the tire after curing of the latter.

Figure 2:
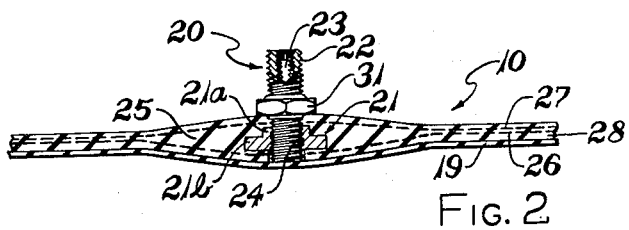
FIG. 2 is an enlarged fragmentary sectional view through the cured tire in the region of the valve more clearly illustrating the manner in which the valve is incorporated in the tire.
Figure 4:
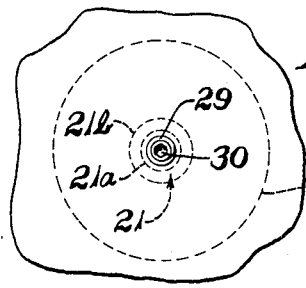
FIG. 4 is a fragmentary top plan view of the portion of the tire shown in FIG. 3.
Figure 3:
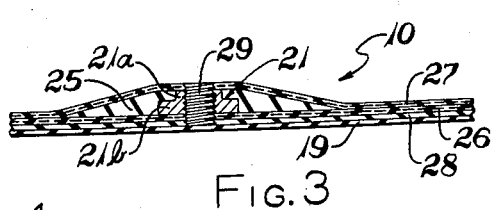
FIG. 3 is an enlarged fragmentary sectional view of an uncured or green tire in the region shown in FIG. 2 illustrating the present preferred embodiment of the method of incorporating the valve in the tire sidewall.

In the presently preferred procedure for incorporating the valve into the tire sidewall, a valve base member 21 having a threaded central bore 24, is embedded in and united with a pad 25 of elastomer which may be substantially circular in outer configuration and of thickness at the central portion in the order of the thickness of the valve base, the pad tapering to a thin edge at the periphery as is indicated by the region between the upper and lower dotted lines in FIGS. 2 and 3. The pad 25 may be cured or vulcanized to effect a firm and permanent union with the valve base member.

The tire 10 is constructed by sequentially placing in superposed relationship, the layer or sheet 19 and at least two plies 26 and 27 of bias-laid fabric reinforced elastomeric material of the type normally employed for building tire carcasses. The layer 19 and the adjacent surface of the ply 26, which may include an extra thickness 28 of elastomer, if desired, are suitably treated, or of compositions such, that adherence of the sheet 19 is effected only in the marginal or edge regions of the sheet and the area therebetween is non-adhered to facilitate separation as indicated in FIG. 1 when the inflation fluid is supplied between the carcass and the sheet 19. The ply 26 is provided with an opening or aperture of diameter substantially the same as that of the threaded bore 24 of the valve base member 21 and, before the ply 27 is applied, the base member 21 with its pad 25 are placed upon the ply 26 with the threaded opening in the valve member aligned with the said aperture or opening in the ply 26, but with the said threaded opening plugged or filled to prevent the entrance of rubber therein during subsequent curing. This temporary filling or plugging of the threaded opening in the valve base member 21 may be effected by any known expedient. Preferably, however, the said filling or plugging of the threaded opening is achieved by inserting in the latter a threaded metal plug 29 of length such that its end surfaces are substantially co-planar with the outer surfaces of the tire carcass, defined by the outer surface of the ply 27 and the inner surface of the ply 26 or of its layer 28. The outer end of the plug 29 is preferably provided with a suitable recess 30, here shown as of hexagonal configuration, for receiving a tool such as a wrench or the like to facilitate applying and removal of the plug.

After the valve base member 21 with its rubber pad 25 has been placed upon the ply 26, the ply 27 is then laid thereover with an opening provided in the latter ply aligned with the threaded bore in the base member 21, a short portion of the plug member 29 preferably projecting into this opening in the ply 27 as indicated in FIG. 3. A strip of thin tread stock 17 is then applied over the portion of the tire carcass which will form the running surface of the tire, the edges of this tread strip terminating short of the sidewall portion in which the valve 20 is located. The carcass is also provided with bead cores 16, the edges of the plies are turned about these cords, and strips of rim cushioning material are supplied to these bead regions if desired. The resulting green or uncured carcass is then removed from the surface on which it has been built or assembled, and is placed in conventional tire shaping and curing apparatus to effect forming and vulcanization of the several parts. The region of the layer 19 intermediate the marginal or edge portions, however, is not bonded or united to the adjacent surface of the tire carcass as has been explained heretofore.

After curing of the tire is complete, the plug 29 is removed from the valve base member 21 and is replaced by the valve stem 22 the lower end of which is threaded for reception in the threaded bore 24 of the base member. To facilitate applying the stem 22 to the base member, the stem may be provided with a polygonally shaped flange portion 31 which is adapted to be engaged by a wrench or other tool. The lower surface of this flange portion 31 is such that it can seat upon the adjacent surface of the tire carcass and effect an air-tight seal therewith, it being remembered that the outer ply of the carcass extends above the end face of the valve base member 21 to provide elastic material for cooperation with the flange 31 of the valve stem to effect the said sealing action. However, if desired, a separate elastic washer may be provided between the flange 31 and the adjacent surface of the tire carcass should this prove necessary or desirable.

The inner end of the valve stem 22 terminates substantially flush with the inner surface of the tire carcass 11 as shown in FIG. 2 and the passage through the valve communicates the region between the layer 19 and the carcass to the exterior of the tire. Hence, inflation of the tire can be effected by supplying an inflation fluid to the valve stem 22, the core member 23 operating in known manner to retain the inflation fluid which causes the layer 19 to move to the position shown in FIG. 1.

Figure 5:
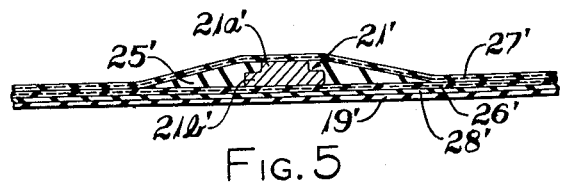
FIG. 5 is a view similar to FIG. 3 but showing another method of incorporating the valve into a tire.

FIG. 5 illustrates a modified embodiment of the invention wherein the valve base member is initially provided in the form of a solid piece of metal. In this embodiment, the valve base member 21' is embedded in and molded to an elastomer pad 25' similar to that employed in the preferred embodiment and the pad with its metal insert are incorporated into the tire in the same manner as previously described except that it is not now necessary to provide apertures in the carcass ply nor a threaded plug in the valve base member. After curing of the tire embodying the modified form of base member 21', a suitable bore is drilled and tapped through this base member and the plies such as 26' and 27' which cover either face of the base member and its pad 25'. This aperture, which does not extend through the separable layer or sheet 19', can be provided by suitably supporting the tire so that the layer or lining 19' falls away from the adjacent face of the carcass during the aforementioned drilling and tapping operation. The valve base member 21', after being thus drilled and tapped, is then identical with valve base member 21 and is provided with a valve stem in the same manner as previously described.

In the illustrated embodiments, the metal valve base members 21 and 21' are each shown as comprising a short shank portion 21a, 21a', respectively and a radially extending flange portion 21b, 21b', respectively. This configuration is not essential to the invention, however, and either of the base members may be of uniform thickness throughout. Moreover, the base portion of the valve need not have the dimensions proportioned as indicated since the thickness thereof need only be sufficient to provide enough thread convolutions in the base 24 to securely hold the valve stem 22.

Although the invention has been described specifically with reference to its incorporation in an emergency tire having a self-contained inflation chamber, the invention is not so limited but may be incorporated in tires of other construction. For example, it is within the purview of this invention to employ the described procedural steps in providing a valve in the side-wall of a tire which is of the type employed without an inner tube and in which the rim on which the tire is mounted forms a part of the inflation chamber, it being understood that such rim will either have no valve opening or that, if the usual valve opening is provided, it will be plugged or blocked. Other adaptations and modifications of the invention, which will be apparent to those skilled in the art, are considered as coming within the ambit of this invention which is limited only by the spirit and scope of the appended claims.

Having thus described the invention, I claim:

1. The method of providing an inflatable tire with an inflation controlling valve in a sidewall of the tire comprising providing a metal valve base member embedded in rubber, placing the said base member between adjacent plies of the tire carcass during construction of the latter with no portion of said base member projecting externally of said plies, curing the completed tire to unite the rubber around the base member with the plies of the carcass, providing communication from the interior of the tire to the exterior through a threaded bore in said base member, and inserting a threaded valve stem in said threaded bore.

2. The method of providing an inflatable tire with an inflation controlling valve in the sidewall of the tire comprising providing a metal valve base member embedded in rubber and having a threaded central aperture, providing the threaded aperture with a removable insert, placing the said base member between adjacent plies of the tire carcass during construction of the latter so that the said base member is completely covered by said plies except for apertures in the latter aligned with the threaded opening of the base member and with no portion of the said base member or insert projecting externally of the plies, thereafter curing the completed tire to unite the rubber around the base member with the plies of the carcass, and then removing the said insert from the base member and replacing it with a threaded valve stem.

3. The method of providing an inflatable tire with an inflation controlling valve in the sidewall of the tire comprising providing a metal valve base member embedded in rubber, placing the said base member between adjacent plies of the tire carcass during construction of the latter so that the said base member is completely covered by said plies, curing the completed tire to unite the base member with the plies of the carcass, forming a threaded bore through said base member and apertures in said fabric plies aligned with the said threaded bore, and inserting a threaded valve stem in said threaded bore.

4. The method of providing an inflatable tire with an inflation controlling valve in the sidewall of the tire comprising providing a metal valve base member having a short internally threaded shank and a radially extending flange, placing the said base member between adjacent plies of the tire carcass during construction of the latter so that the said flange of the base member is completely covered by said plies with the threaded bore of the member aligned with apertures in the plies and with no portion of the base member projecting externally of the plies, thereafter curing the completed tire to unite the base member with the plies of the carcass, and then screwing a threaded valve stem into said threaded bore.

5. The method of providing an inflatable tire with an inflation controlling valve in the sidewall of the tire comprising providing a metal valve base member having a threaded bore therethrough, the said member being embedded in a pad of elastomer the thickness of which is such that its upper and lower surfaces are substantially coplanar with the end surfaces of the base member, providing the said threaded bore with a removable insert, placing the base member between adjacent plies of the tire carcass during construction of the latter so that the said base member is completely covered by said plies, the said plies having apertures aligned with the threaded bore of the base member and occupied by said insert, thereafter curing the completed tire to unite the base member with the plies of the carcass, and then removing the said insert from the base member and replacing it with a threaded valve stem.

6. The method of providing an inflatable tire with an inflation controlling valve in the sidewall of the tire comprising providing a metal valve base member having a short internally threaded shank and a radially extending flange embedded in a pad of elastomer the thickness of which is such that its upper and lower surfaces are substantially coplanar with the ends of said base member, closing the said internally threaded shank with a removable insert, placing the said base member between adjacent plies of the tire carcass during construction of the latter so that the said base member is completely covered by said plies, the said plies having apertures aligned with the threaded opening of the base member, thereafter curing the completed tire to unite the base member with the plies of the carcass, and then removing the said insert from the base member and replacing it with a threaded valve stem.

7. The method of providing an inflatable tire with an inflation controlling valve in the sidewall of the tire comprising providing a metal base member having a threaded bore therethrough, the said member being embedded in a pad of elastomer the thickness of which is such that its upper and lower surfaces are substantially coplanar with the end surfaces of the base member, placing a removable insert in said thread bore, placing the base member between adjacent plies of the tire carcass during construction of the latter so that the said base member is completely covered by the plies, the said plies having apertures aligned with the threaded bore of the base member and occupied by said insert with the ends of said insert substantially flush with the inner and outer surfaces of the carcass, thereafter curing the completed tire to unite the base member with the plies of the carcass, then removing the said insert from the base member and replacing it with a threaded valve stem having a radially extending flange externally of the carcass, and threading said stem into said base member until the said flange engages the external surface of the carcass in fluid-tight sealing relationship.

References Cited in the file of this patent

UNITED STATES PATENTS

| | | |
|---|---|---|
| 1,245,838 | Wallace | Nov. 6, 1917 |
| 2,230,879 | Bronson | Feb. 4, 1941 |
| 2,666,007 | Hovey | Jan. 12, 1954 |